March 18, 1941.  I. W. SIMPKINS ET AL  2,235,175
PORTABLE AUXILIARY POWER UNIT FOR TRAILERS
Filed Dec. 18, 1939  4 Sheets-Sheet 1

Isaac W. Simpkins
and Eugene R. Nelson
Inventors

By *(signature)*
Attorney

March 18, 1941.   I. W. SIMPKINS ET AL   2,235,175
PORTABLE AUXILIARY POWER UNIT FOR TRAILERS
Filed Dec. 18, 1939   4 Sheets-Sheet 2

Isaac W. Simpkins
and Eugene R. Nelson
Inventors

By Ravess Eaton
Attorney

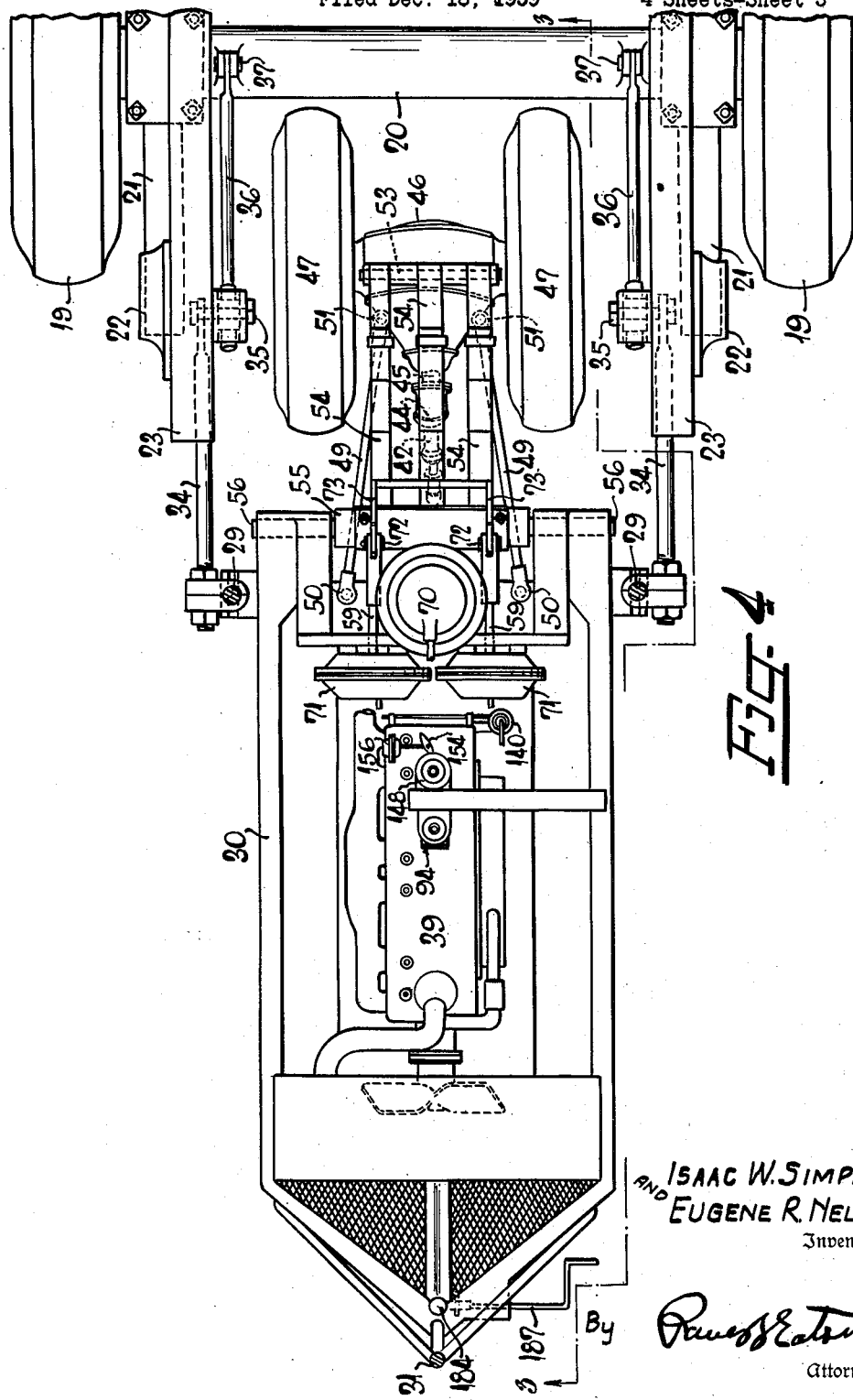

March 18, 1941. I. W. SIMPKINS ET AL 2,235,175
PORTABLE AUXILIARY POWER UNIT FOR TRAILERS
Filed Dec. 18, 1939 4 Sheets-Sheet 4
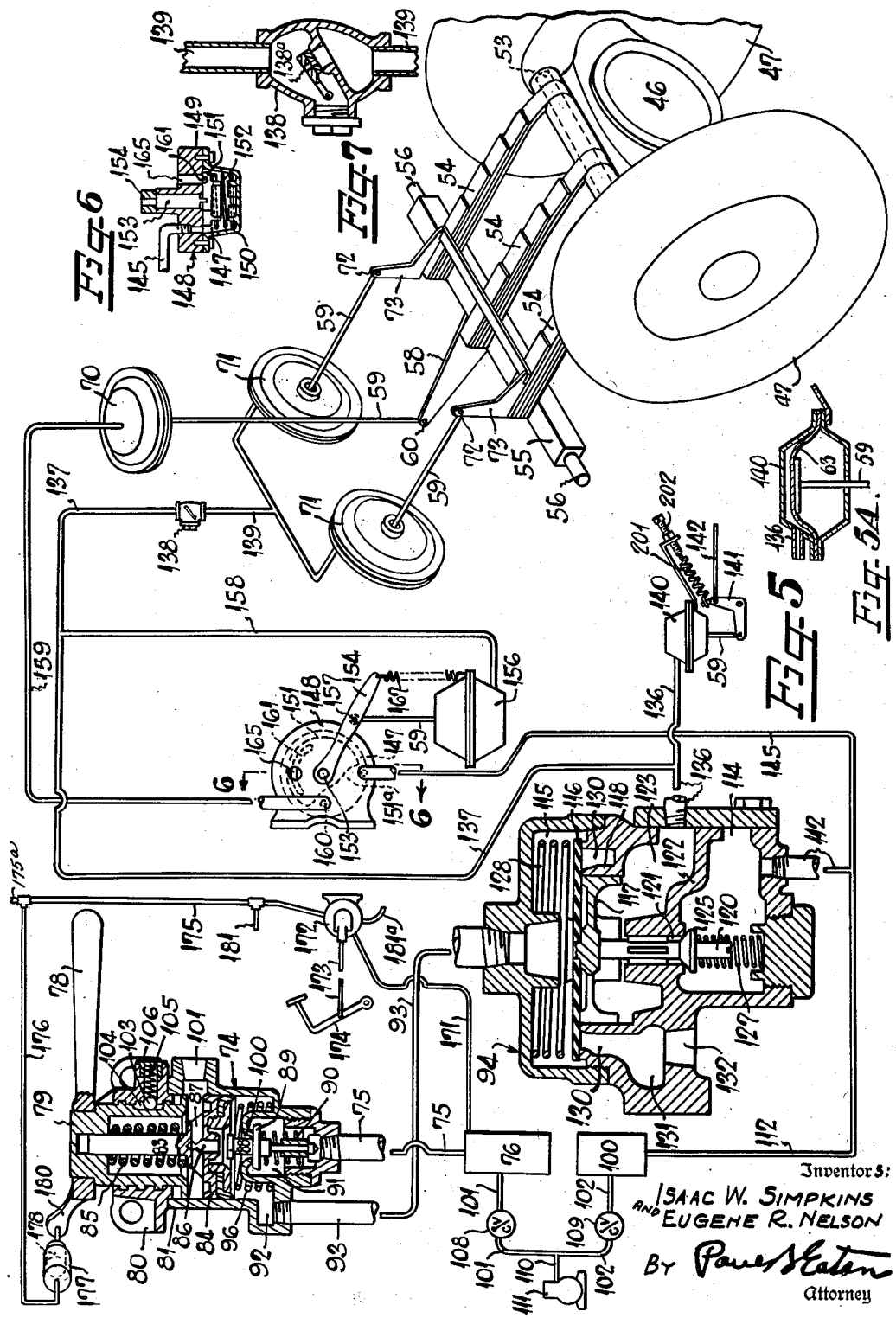
Inventors:
ISAAC W. SIMPKINS
AND EUGENE R. NELSON
By Paul S Eaton
Attorney Patented Mar. 18, 1941

2,235,175

UNITED STATES PATENT OFFICE 2,235,175

PORTABLE AUXILIARY POWER UNIT FOR TRAILERS

Isaac W. Simpkins and Eugene R. Nelson, Charlotte, N. C., assignors to Power Brake Company, Charlotte, N. C., a corporation of North Carolina Application December 18, 1939, Serial No. 309,842

16 Claims. (Cl. 180—14)

This invention relates to a portable auxiliary power unit for trailers which is adapted to be used in combination with a tractor when it is necessary to supply additional power. Very often the truck and tractor need an additional power unit, especially when a steep grade is encountered. Instead of placing the tractor motor in low gear and travelling up the grade at a very slow speed, the present invention contemplates placing an additional motor on the trailer and connecting this motor to a retractible set of wheels which are adapted to be raised or lowered at the will of the operator in the driver's seat of the tractor.

It is a well known fact that trucking companies operate transfer trucks over great distances, and in many cases, these trucks operate over ranges of mountains. As heretofore stated, the present invention is particularly adaptable for use on steep grades such as encountered in mountainous areas, but on the other hand when the truck is travelling over a relatively level country the need for additional power is not present. Therefore, by providing a portable power unit which may be easily removed and installed, the unit can be detached when the truck and trailer reach a level country and again be installed on the same or another trailer on a return trip when travelling in the opposite direction towards the mountainous area.

It is therefore an object of this invention to provide a motor vehicle comprising a tractor and a trailer, with the trailer having a retractible driving unit mounted thereon which unit has a raising and lowering mechanism controlled from the driver's seat in the tractor.

It is another object of this invention to provide a device of the class described with means controlled from the driver's seat for automatically actuating the throttle of the auxiliary power unit when a predetermined amount of pressure has been exerted between the retractible wheels and the ground. The reason for providing this type of throttle control means is to insure that the proper friction between the auxiliary wheels and the ground will be present before power is applied thereto. The proper friction will prevent skidding of the wheels and undue racing of the motor.

It is a still further object of this invention to provide an auxiliary power unit of the class described having means controlled by the lifting apparatus for cutting off the throttle together with means for delaying the action of the lifting means after the throttle has been cut off so that the gears in the auxiliary power unit can be shifted. In other words the fuel supply to the auxiliary power unit is instantly cut off when the operating valve in the driver's seat is actuated, after which the lifting means will automatically operate to slowly lift the auxiliary wheels from the ground. This lifting is delayed a short time so that in case the driver wishes to shift the gears on the auxiliary power unit, he can do so while the motor speed is low, and also without any fear of the wheels raising from the ground. Of course immediately after the gears are shifted, the operating valve is again actuated so as to renew the proper pressure between the auxiliary power wheels and the ground.

It is yet another object of the invention to provide means in an auxiliary power unit for trailers, whereby when the brakes are applied in the cab of the tractor, the flow of fuel to the auxiliary power unit will be diminished or entirely stopped.

Some of the objects of the invention having been stated, other objects will appear as the description proceeds, when taken in consideration with the accompanying drawings, in which—

Figure 4 is a plan view taken along the line 4—4 in Figure 3.

Figure 5 is a diagrammatic view showing the valve arrangement and the operating mechanism for raising and lowering the retractible unit;

Figure 5A is a sectional view through diaphragm motor 140 in Figure 5;

Figure 6 is a sectional view taken along the line 6—6 in Figure 5 through the sander valve;

Figure 7 is a sectional view through the check valve 138 showing the air exhausting port.

Figure 1:
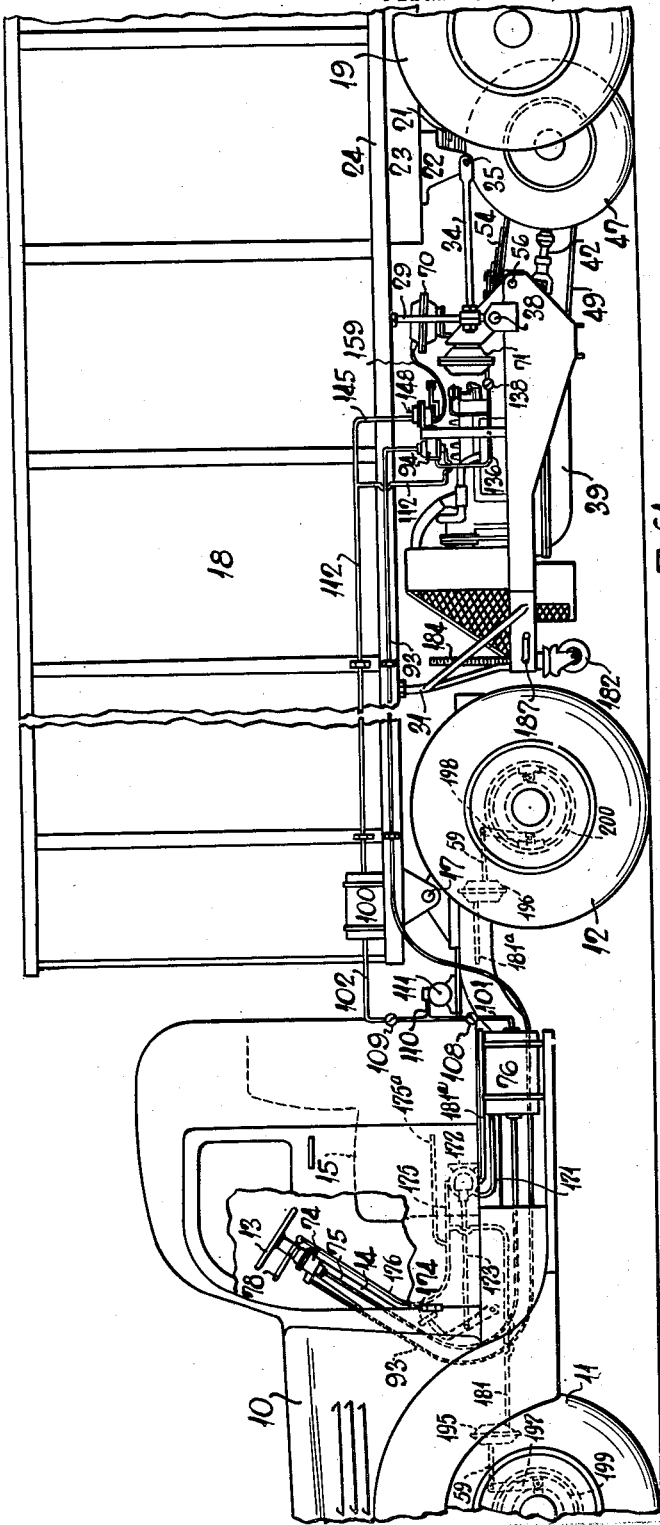
Figure 1 is a side elevation of portions of a tractor and a trailer embodying the present invention.

Referring more specifically to the drawings, the numeral 10 denotes a tractor having front wheels 11 and rear wheels 12. The front wheels are operated in a conventional manner by means of a steering wheel 13 which is mounted upon the upper end of a steering column 14. The operator of the tractor is adapted to be seated in a seat 15 during the operation of the tractor.

The rear portion of the tractor has pivotally secured thereto as at 17, the foremost end of a trailer bed 18. This trailer bed can be of any desired length and has its trailing end supported by wheels 19 which are rotatably mounted on the ends of axle 20. Disposed between the axle 20 and the bed 18, are suitable conventional springs 21, the ends of which are adapted to support brackets 22 which in turn support side channel members 23 and 24. The channel members 23 and 24 are preferably constructed of steel so as to form a rigid framework for the trailer member. By referring to Figure 3, it will be seen that the side channel members 24 run longitudinally of the trailer member and have transversely disposed channel members 26 disposed there between.

Figure 3:
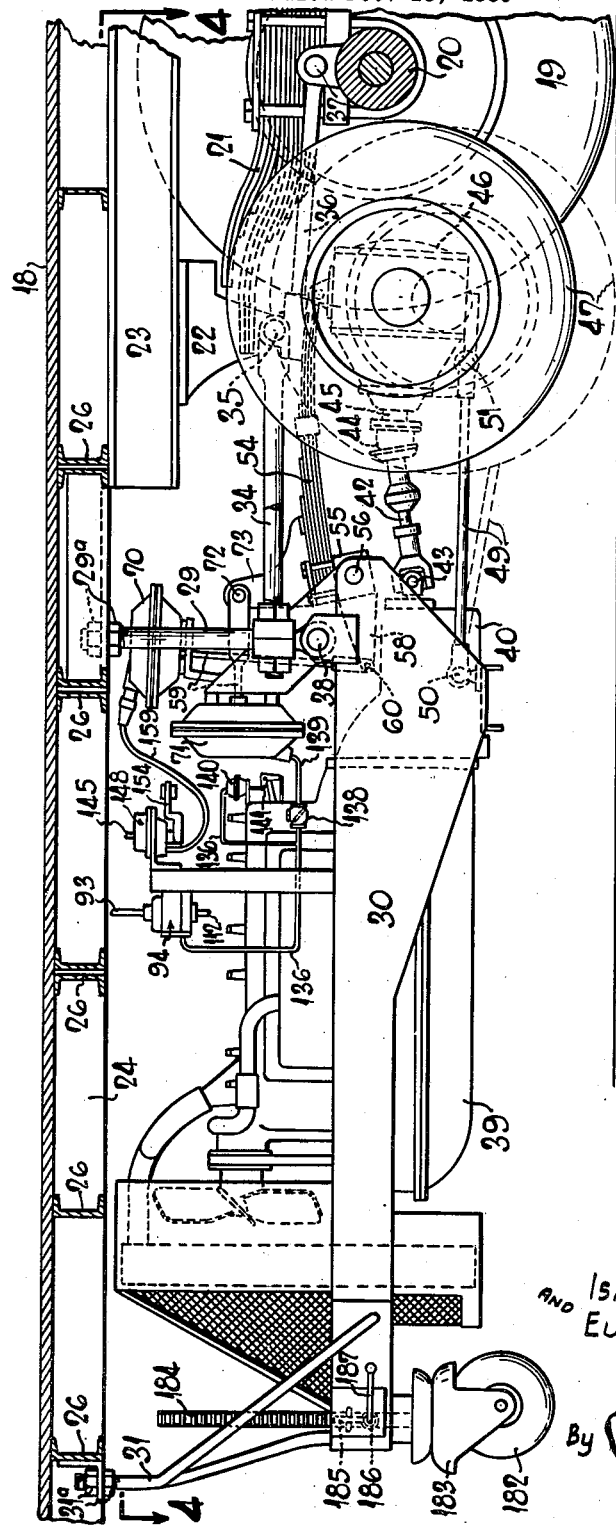
Figure 3 is a sectional view through a portion of the trailer taken along the line 3—3 in Figure 1, and showing in elevation on an enlarged scale the auxiliary power unit, with the wheels thereof in a retracted position.

In order to furnish the desired auxiliary power for this trailer so that the motor within the tractor 10 can be assisted while the tractor and trailer are moving up-grade, it is necessary to suspend beneath the trailer framework a power unit in a manner such as shown in Figures 1 and 3. It is here seen that the transverse channel members 26 have hanger rods 29 secured thereto which rods support the intermediate portion of a motor framework 30; whereas another hanger rod 31 is adapted to have its upper end connected to another transverse channel member 26 and to have its lower end connected to the front portion of the framework 30. The upper ends of the hanger rods 29 and 31 have nuts 29a and 31a respectively secured thereon in such a manner that they may be easily detached when it is desired to remove the framework 30 from beneath the trailer.

An additional means must be provided for connecting the framework 30 to the rear axle 20 so that when the auxiliary wheels are lowered, the power from engine 39 exerted thereby will be immediately transmitted to the trailer unit. This connection comprises horizontally and rearwardly disposed rods 34 which have the foremost ends thereof connected to the lower intermediate portions of hanger rods 29 and the rear or trailing ends connected as at 35 to bracket 22. Also connected as at 35 to each bracket 22 is a second horizontal rod 36 each of which has its trailing end connected as at 37 to the rear trailer axle 20. The lower ends of the hanger rods 29 are pivoted very closely to the upper portion of the framework 30 at point 38, therefore the front ends of the rods 34 can be connected very close to this pivot point. Hence any power from engine 39 that is transmitted to the frame 30 can be immediately transmitted by way of the rods 34 and 36 to the rear axle 20.

The framework 30 normally supports a source of power such as an internal combustion motor 39, said motor having a transmission 40 to which a drive shaft 42 is connected as at 43 (Figure 3). The trailing end of the drive shaft 42 is connected as at 44 to differential shaft 45 of differential housing 46. The drive shaft 42 has the conventional splined feature to permit free pivotal movement as to pivots 38, 50, 51 and 35.

By observing Figures 3 and 4 it is seen that the housing 46 has wheels 47 at each end thereof which are driven in the well known manner by shafts 42 and 45. The driving shaft between the transmission and differential is constructed in a conventional manner so that it may occupy the angular position in the manner shown when the wheels 47 are raised from the ground.

Radius rods 49 are provided for keeping the housing 46 in spaced relation to the framework 30, said rods having ball and socket joints 50 and 51 secured to the front and rear ends thereof respectively which assist in supporting the wheels 47 when raised by a mechanism which will be hereinafter described.

The upper side of the housing 46 has pivoted thereto as at 53 a plurality of springs 54, and the front ends of these springs are secured to the upper side of a squared axle member 55, the ends of said axle member being restricted as at 56 and are pivoted in the framework 30.

Extending forwardly from the intermediate portion of the squared axle 55 is a lever arm 58, to which is pivoted the lower end of an operating rod 59 as at 60. The upper end of this rod penetrates a housing 61 of diaphragm assembly 70 which in turn has secured thereto a cap member 62 (see Figures 2, 3 and 5). Between the members 61 and 62 is secured the rim of a flexible diaphragm member 63 and the intermediate portion of this diaphragm member is secured to the uppermost end of the rod 59. The housing members 61 and 62 are secured together by any suitable means such as bolts 64. Normally the diaphragm member 63 is forced in the position shown in Figure 2 by any suitable means such as a compression spring 65 within the housing members; however, when it is desired to move the rod 59 to the right in Figure 2 or downwardly in Figure 3, it is only necessary to introduce air into a compartment 66 which is disposed to the left of the diaphragm member 63 in Figure 2. This air is introduced by way of a port 67, and upon the introduction of this air, the flexible diaphragm member 63 will move to the right gradually increasing the size of the chamber 66 and diminishing the size of chamber 68 to the right of the diaphragm member.

Figure 2:
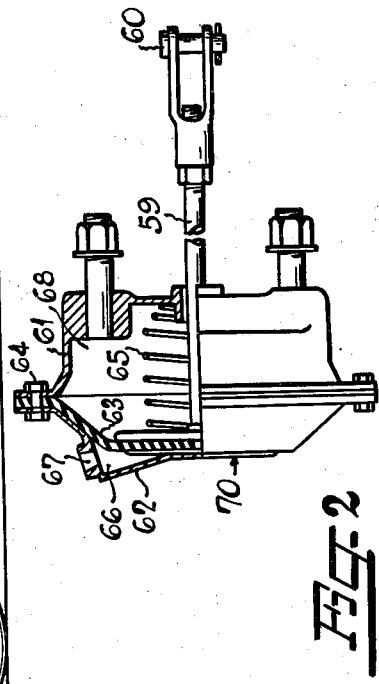
Figure 2 is a view of a typical diaphragm valve, with portions thereof shown in section, which valve is used for raising and lowering the auxiliary power wheels as well as for performing other functions.

The diaphragm member shown in Figure 2 is typical of all of the diaphragms employed to carry out the various operations to be hereinafter described in connection with the auxiliary power unit. In order to keep the various diaphragm motors distinguished from each other, a different reference character will be employed, yet it is to be understood that the internal structure and the principle of operation of all of them are essentially the same.

The structure employed in the diaphragm motors for raising the wheels 47 from the ground will be broadly designated by the reference character 70.

In order to lower the wheels 47, two suitable assemblies 71 are employed which are identical to the diaphragm assembly 70 recently described. These assemblies 71, likewise have rods 59 extending therefrom, the ends of which are secured as at 72 to brackets 73. The brackets 73 are mounted upon the upper side of the springs 54 and are also rigidly secured to the axle 55. Upon the introduction of air into the assemblies 71 their respective rods 59 are moved to the right in Figures 3, 4 and 5 to rotate arms 73, axle 55 and springs 54 in a clockwise manner in Figure 3 to cause the wheels to be lowered. On the other hand, when it is desired to raise the wheels, air is exhausted from diaphragm assemblies 71 and at the same time air is introduced into the diaphragm assembly 70, which, in turn, will move parts 73, 55 and 54 in the opposite direction from that above described to rotate the axle 55 in a counterclockwise manner to raise the wheels.

The operation of the diaphragm motors 70 and 71, as well as other operations, are controlled from the driver's seat 15 of the tractor unit. A hand valve for controlling these valves is indicated by the reference character 74 and is secured to the steering column 14. This hand valve is supplied with air through a suitable supply pipe 75 which pipe has the other end thereof communicating with a compressed air supply tank 76. The valve is provided with a suitable hand lever 78 which has one end thereof secured to the upper end of a spring cage 79, said cage being threadably secured within a cover 80, said cover being secured to the top of a casing 81 in which the valve control mechanism is located. Cover 80 and casing 81 have slidably mounted therein a piston assembly 83, which assembly has a piston 84 secured on the lower end thereof and is normally forced downwardly by means of a graduating spring 85. The lower central portion of the piston assembly has vertically disposed port 86 therein having a transversely disposed port 87 communicating therewith through which the air is allowed to pass when the pressure is desired to be released. The port 86 normally contacts the closure button 88 which projects upwardly from the upper side of an inlet valve 89. This inlet valve is normally forced upwardly by inlet valve 90 to prevent the air from flowing from chamber 91 into chamber 92 when the pressure within the chamber 91 is equal to or greater than the downward pressure exerted by the spring 85 upon the piston assembly 83.

A return spring 96 is provided directly below the piston assembly 83 to return it when the graduating spring 85 is not compressed. Let us assume that it is desired to let air pass from pipe 75 and the chamber 90 into the chamber 92 and then to pipes 93 and to relay valve 94. In this case, the hand lever 78 is operated or turned which will screw the spring cage 79 downwardly and will apply pressure to the spring 85 which, in turn, will force piston assembly 83 downwardly against button 88 to close outlet port 86 and prevent the air from passing outwardly through ports 87 into space. Upon further turning of the spring cage, valve 89 is forced downwardly to allow the air to pass through port 100 from chamber 91 into chamber 92. The air continues to flow from chamber 91 into chamber 92 until the pressure within chamber 92 has become sufficient to force the piston assembly 83 and piston 84 upwardly against compression spring 85, so that valve 89 will close the port 100. At this time, the button or closure means 88 will also be closing the valve or port 86 which will prevent any outflow of the air from the chamber 92. It is therefore seen that the greater the pressure exerted upon the graduating spring 85 by rotation of handle 78, the greater the amount of pressure will be necessary within chamber 92 to cause the valve 89 to close port 100; consequently, it is seen that the pressure within the pipe 93 and relay valve 94 can be varied any desired amount.

In the drawings, the button or closing means 88 is shown slightly removed from the ports 86, and in this position the air will be allowed to move upwardly from the chamber 92 through ports 86, 87 and 101 into space. This position is only maintained when it is desired to entirely relieve the pressure from relay valve 94.

A suitable lock ball 103 is provided which is adapted to be resiliently pressed into suitable notches such as 104, cut in the periphery or exterior surface of spring cage 79. This ball is resiliently pressed against the side of the spring cage by any suitable means such as compression spring 105 and is confined in the cavity by means of a nut 106. It is quite evident that a plurality of notches 104 may be provided so that when the spring cage has been rotated to the desired point it will fall into one of these notches and yieldingly hold the spring gauge in position. Where the threads on the spring gauge are properly pitched, the members 103 to 106 may be entirely eliminated, but it is preferable to have notches so that the operator may be assured that the spring cage will not move upwardly to relieve the pressure after it has once been properly applied.

It will be seen by referring to Figure 1 that the pressure tank 76 is disposed upon the tractor, whereas a similar pressure tank 100 is carried by the trailer 18. These tanks have pipes 101 and 102 respectively leading therefrom in which check valves 108 and 109 are installed. The two pipes 101 and 102 merge into a single pipe 110, the other end of which is connected to air compressor 111.

The trailer tank 100 has a pipe 112 leading therefrom, the other end of which is connected to the lower side of relay valve 94 and is adapted to communicate with a chamber 114 therein. The special function of the relay valve 94 is to quickly transmit the air pressure from the trailer tank 100 to the operating valves 70, 71, and other valves which will hereinafter be described. When it is desired to quickly transmit this pressure, the handle 78 in the operating valve 74 is operated as previously described, at which time the air from the tractor tank 76 will pass therethrough and enter the relay valve 94 by means of the connecting pipe 93.

The lower end of the pipe 93 communicates with a chamber 115 in the upper portion of the relay valve (Figure 5). Disposed in the lower portion of the chamber 115 is a flexible diaphragm 116, which diaphragm normally rests upon a piston 117, said piston being mounted for vertical sliding movement in a cylinder 118. The flexible valve 116 also is adapted to rest upon the upper rim of the cylinder 118. Piston 117 has a centrally disposed stem 120 extending downwardly therefrom which stem penetrates a bore 121 which is larger than the stem. This bore is disposed in partition 122 which separates chamber 114 from a chamber 123. It will be noted that the stem 120 has a valve 125 therearound which normally closes the port 121 under the force of a compression spring 127 therebelow. A compression spring 128 is disposed within chamber 115 and above the flexible diaphragm 116 for normally holding the top edges of this diaphragm in position, said outer edges being adapted to cover an annular groove 130 which surrounds the cylinder 118. Groove 130 communicates with chamber 131, said chamber having an outlet port 132 communicating therewith. When it is desired to transmit the pressure from the trailer tank 100 into the lowering diaphragm valves 71 it is only necessary to turn the handle 78 of the operating valve 74 in the manner previously described. This will allow the air from the tractor tank 76 to enter the compartment 115 and when the pressure is built up within this compartment the central portion of the diaphragm 116 will move downwardly along with the piston 117 forming an upper concave surface. This bulging effect will not cause the outer edges of the diaphragm to become unseated, but instead the annular groove 130 will remain covered. Upon the downward movement of the central portion of the diaphragm 116, the piston 117 and piston stem 120, the valve 125 will likewise move downwardly to open the port 121. Upon the opening of this port the air from the tank 100 will immediately rush into chamber 114 upwardly through port 121 and into compartment 123. From the compartment 123 the air will exhaust into pipe 136, pipe 137, check valve 138, pipe 139, and into diaphragm motors 71 which will be actuated to cause the squared axle 75 to rotate in a clockwise manner in Figures 1, 3 and 5 to allow the auxiliary traction wheels 147 to be moved downwardly into contact with the ground.

The air from the cylinder 100 also flows through the relay motor 94 and through pipe 136 into a diaphragm valve 140, which valve has a piston rod 59 extending therefrom, the outer end of which is connected to a throttle actuating bell crank 141. The other leg of the bell crank 141 actuates a throttle control rod 142. The construction of the motor is essentially the same as motor 70 in Figure 2, except the spring 65 within the housing is omitted; however, a spring 201 is secured to bell crank 141 for loading the diaphragm 63 within the casing (Figure 5A). The amount of tension in the spring and also the initial load upon the diaphragm is varied by means of bolt 202 to which the other end of the spring is attached. The diaphragm motor 140 is preferably spring loaded initially so that it requires a pressure of approximately 50 pounds of air to start operating it. This will allow sufficient pressure to be exerted between the traction wheels 47 and the ground before the throttle to the engine on the auxiliary power unit is actuated. Therefore, it is seen that as the pressure in the relay valve is increased, there is a corresponding increase in the amount of gas fed to motor 39.

A slightly different means is employed for raising the wheels 47 out of contact with the ground when the additional power of engine 39 is not needed.

By observing Figure 5 it is seen that the pipe 112 has a pipe 145 communicating therewith, the other end of which communicates with chamber 147 of a valve 148 (Figure 6). The valve 148 essentially comprises three members, namely, a base member 149, a cover 150, and a cap 151, said cap member being disposed within the cover 150 and rotatably resting against lower side of the base member 149. The cap 151 is normally held in position by means of a compression spring 152. The central portion of this cap member 151 has a stem 153 extending upwardly therefrom and through the base member 149. The upper end of the member 153 has a lever 154 secured thereto. The lever 154 has a rod 59 of a standard diaphragm motor 156 secured thereto as at 157. Leading to the diaphragm motor 156 is a pipe 158, the other end of which communicates with the interior of pipe 139, previously described, and which pipe receives air from the relay valve chamber 123.

Of course when the air is turned onto the pipe 139 and valves 71 to cause wheels 47 to be lowered, the air is simultaneously introduced into the diaphragm motor 156 by way of pipe 158, and this will rotate the lever 154 away from the observer (Figure 5) in a counter-clockwise manner to provide a passageway through which the air from the raising diaphragm 70 and pipe 159 may be exhausted. The raising diaphragm 70 has one end of pipe 159 leading therefrom, the other end of said pipe being connected to the sander valve 148 as at port 160. Normally the port 160 in the sander valve is closed by means of the cap plate 151 therebeneath, that is, the port is closed when the wheels 47 are in raised position to prevent the air from escaping from the diaphragm motor 70, but when it is desired to lower the wheels and exhaust air from the chamber from the diaphragm motor 70, the cap member 151 is rotated in a counter-clockwise manner in Figure 5 by means of the members 154 and valve 156, thereby causing an arcuate groove 161 which is disposed in the top of the cap member 151 (Figure 6) to communicate with the outlet port 160 of pipe 159 and also communicate with the port 165 in the base member 149. However, when it is desired to maintain the pressure within the lifting diaphragm motor 70, as in case when the wheels are being lifted from the ground, the pipes 145 and 159 communicate with each other by way of the valve chamber 147. This communication is possible because the air will be exhausted from valve 156 and at that time cut-away portion 151a within the cap member 151 will not close either of the outlets to the respective pipes. Ordinarily, the diaphragm 156 has a conventional spring 166 therein, such as shown in Figure 2, but in order to supplement this spring pressure with an additional positive force to insure the proper actuation of the sander valve 148, an additional spring 167 has been provided.

Whenever the wheels 47 are raised, it is necessary as previously stated, to release the air from the diaphragm valves 71. This pressure release however is not instantaneous, but instead it is allowed to escape slowly through a small port or opening 138a in the check valve 138 (Figure 7). The time ordinarily necessary to allow the pressure to escape from the diaphragm 71 through the port is about a minute and a half, but it should be borne in mind that when the valve 74 within the driver's seat is actuated to produce the operation, that the air from the chamber 123 in the relay valve 94 is immediately released. This release takes place when the air is exhausted from the upper chamber 115, thereby allowing the valve 125 to close the port 121 and at the same time return flexible diaphragm member 116 to normal position. When the pressure is released from the upper chamber leaving an upward air pressure in the lower chamber, the air from this lower chamber will force the outer periphery of the diaphragm member 116 upwardly to flow into annular groove 130 and then outwardly to exhaust port 132. Due to the fact that it takes considerable time for the air to leak out from the diaphragm chambers 71, the wheels 47 will remain in contact with the ground; however, the air will instantly exhaust from throttle diaphragm and slow down the motor should the driver merely wish to change the gears in the auxiliary power unit. This gear changing mechanism for the auxiliary motor is conventional and is also operated from the driver's seat in a conventional manner.

Briefly the operation of the apparatus is as follows: To lower the device, the valve 74 is actuated allowing air to pass therethrough from cylinder 76 into relay chamber 115, which will operate the diaphragm 116 therein to cause the air from the trailer cylinder 100 to also enter the relay valve and to be exhausted therefrom into the lowering diaphragm 71 to cause the wheels to be lowered and at the same time to admit air into the throttle actuating valve 140 which in turn will actuate the throttle arm 142 of the trailer engine 39 to open said throttle when a predetermined amount of pressure has been exerted between the wheels and the ground. At the same time, the lowering is effected, air is introduced into diaphragm valve 156 which will rotate the handle 154, of the valve 148. This will rotate the cap member 151 therein in a counter-clockwise manner in Figure 5, causing the port 160 of pipe 159 and the exhaust port 165 in the sander valve to communicate with each other which will relieve the air pressure from the raising diaphragm motor 70.

To raise the wheels 47 the handle 78 of hand valve 74 is turned in the opposite direction thereby releasing the pressure from the upper chamber 115 and allowing the air to escape from the chamber 123 therebelow as well as from pipes 136, 137 and 158 and diaphragm 156. The air, at the same time, will slowly escape from the diaphragm motors 71 through pipes 139 and opening 139a in check valve 138. At this time, the air from the trailer cylinder 100 will move directly through pipes 112 and 145, through valve 148 and into the diaphragm cylinder 70 to cause the wheels 47 to be raised out of contact with the ground. The valve 148 is known commercially as a "sander" valve, but is used as a three-way valve in the present instance for admitting and exhausting air from diaphragm motor 70.

There are occasions when it is desired to automatically cut off the gasoline or fuel supply from the auxiliary motor 39 when the quick application of brakes is necessary. In order to insure that means will be provided for automatically cutting off the gasoline to the auxiliary motor upon application of pressure upon the brake pedal, a suitable air line 171 is provided, one end of which is connected to tractor tank 76 and its other end connected to a standard application air valve 172. An operating rod 173 is disposed between valve 172 and a conventional brake pedal 174, said rod being adapted to open the valve when it is moved to the left (Figure 5) upon applying pressure to the brake pedal. When valve 172 is opened, the compressed air will flow from tank 76 into this valve from whence it will flow through a line 175 and thence to a line 176 which supplies air to cylinder 177. The line 175 has leading therefrom another line 175a which supplies air for operation of conventional trailer brake connections, not shown. The cylinder 177 has a piston 178 therein which will be forced outwardly or to the right in Figure 5, thus causing plunger rod 179 to engage lug 180 of hand lever 78 to thereby cause the spring cage 79 to rotate and exhaust the air from throttle diaphragm 140, and thereby reduce the motor 39 to idling speed. In other words, when the brake lever 174 is pressed, the service line 175 has compressed air admitted therein which air will be transmitted to cylinder 177 to cause hand valve to be automatically operated to cut off the gas to motor 39. Upon release of brake pedal 174, the air is automatically released from cylinder 177 through the conventional release port of application valve 172. The line 175 furnishes air to the conventional front and rear wheel diaphragm motors 195 and 196 respectively, through pipes 181 and 181a, respectively. These motors are similar in construction to diaphragm motor 70 (Figure 2) and each has a rod 59 extending therefrom which operates brake lever 197 and 198, said brake levers being adapted to operate brakes 199 and 200 on the front and rear tractor wheels, respectively.

It is desirable to have the auxiliary power unit mounted on suitable wheels so that when it is removed from a trailer unit, it can be rolled about from place to place. In other words, a portable unit is most desirable. When the hanger rods 29 and 31 are detached from the trailer body the rear wheels 47 of the unit are lowered to dotted line position as shown in Figure 3. Then a front swivel wheel 182 is lowered to the ground to hold the front end of the unit in elevated position. This swivel wheel is rotatably mounted in a bracket 183 which bracket has a vertically disposed grooved shaft 184 secured to the upper end thereof. This shaft 184 penetrates the front end of the framework 30 and the grooves therein are engaged by the gear 185 which gear also meshes with a worm 186 on crank 187. By turning the crank 187, the shaft 184 and its associated wheel 192 can be raised or lowered to the desired position. When the unit is mounted on a trailer the wheel 182 is raised to elevated position as shown in the drawings, so as to move it out of contact with the ground.

Especial attention is called to the position of the wheels 47 of the auxiliary power unit relative to the trailer wheels 19. It will be noted that the wheels 47 are mounted at the ends of a very short differential housing thereby making the distance between the wheels correspondingly short. Also the wheels 47 of the unit are symmetrically positioned along the longitudinal center line of the trailer in advance of the trailer axle 20, but at the same time, as close to the axle as is consistent with the proper raising and lowering operations. By providing a prime mover having wheels whose gauge is very much narrower than the gauge of the trailer wheels and by locating the prime mover wheels in advance of the trailer axle so that they occupy an overlapping relationship to the trailer wheels, there is very much less sidewise drag of the unit wheels when the trailer turns a curve.

Also since the unit is suspended at three points, namely by one hanger rod 31 at the front and two hanger rods 29 near the rear, there is a limited amount of sidewise flexibility of the unit which is very essential when the trailer and unit are turning curves. In other words, when a lateral or sidewise thrust is exerted upon the unit wheels 47, the entire unit will be allowed to adjust itself to this thrust and thereby materially reduce the drag on the wheels.

In the drawings and specification there has been set forth a preferred embodiment of the invention, and although specific terms are employed, they are used in a generic and descriptive sense only and not for purposes of limitation, the scope of the invention being set forth in the appended claims.

We claim:

1. In a trailer adapted to be pivotally secured at its front end to the rear end of a tractor and having wheels supporting the rear end thereof, a framework having a prime mover mounted therein, a traction wheel mounted on the framework, means normally holding the traction wheel out of contact with the roadway, means controlled by the operator of the tractor for lowering the traction wheels and exerting the necessary pressure thereon to hold the same in contact with the roadway, driving means between the prime mover on the framework and the traction wheels, means preventing operation of the prime mover until a predetermined amount of pressure has been applied to the traction wheels of the framework to hold them in contact with the roadway, and means for raising the tractor wheels of the framework from contact with the roadway.

2. In a trailer adapted to be pivotally secured at its front end to the rear end of a tractor and having wheels supporting the rear end thereof, a detachable framework having a prime mover mounted therein, a plurality of traction wheels mounted on the framework, means normally holding the traction wheels out of contact with the roadway, means controlled by the operator of the tractor for lowering the traction wheels and exerting the necessary pressure thereon to hold the same in contact with the roadway, driving means between the prime mover on the framework and the traction wheels, means preventing operation of the prime mover until a predetermined amount of pressure has been applied to the traction wheels of the framework to hold them in contact with the roadway, means for raising the tractor wheels of the framework from contact with the roadway and means controlled by the application of brakes on the tractor for preventing output of power by the prime mover.

3. In a trailer adapted to be pivotally secured at its front end to the rear end of a tractor and having wheels supporting the rear end thereof, a framework having a prime mover mounted therein, a traction wheel mounted in the framework, means normally holding the traction wheel out of contact with the roadway, means controlled by the operator of the tractor for lowering the traction wheels and exerting the necessary pressure thereon to hold the same in contact with the roadway, driving means between the prime mover on the framework and the traction wheels, means preventing operation of the prime mover until a predetermined amount of pressure has been applied to the traction wheels of the framework to hold them in contact with the roadway, means for raising the tractor wheels of the framework from contact with the roadway, and means for reducing the power of said prime mover upon the reduction of pressure below said predetermined amount between the traction wheels and the ground.

4. In a trailer adapted to be pivotally secured at its front end to the rear end of a tractor and having wheels supporting the rear end thereof, a framework having a prime mover mounted therein, a traction wheel mounted in the framework, means normally holding the traction wheel out of contact with the roadway, means controlled by the operator of the tractor for lowering the traction wheels and exerting the necessary pressure thereon to hold the same in contact with the roadway, driving means between the prime mover on the framework and the traction wheels, means preventing operation of the prime mover until a predetermined amount of pressure has been applied to the traction wheels of the framework to hold them in contact with the roadway, means for raising the tractor wheels of the framework from contact with the roadway, means controlled by the application of brakes on the tractor for preventing output of power by the prime mover, and means for reducing the power of said prime mover upon the reduction of pressure below said predetermined amount between the traction wheels and the ground.

5. In a trailer having its front end pivotally supported by the rear end of a tractor and having its rear end supported by wheels, a unit secured to the lower side of the trailer frame and having an internal combustion engine mounted therein, a pair of traction wheels supported by the framework, means controlled by the driver of the tractor for raising and lowering the traction wheels of the unit out of and into contact with the roadway, means for automatically delivering an increased amount of fuel to said engine when the traction wheels have a predetermined amount of pressure applied thereto to hold them in contact with the roadway, means controlled by the driver of the tractor for regulating the fuel supplied to the engine of the unit and means controlled by the brake applying means of the tractor for reducing the supply of fuel to the engine of the unit.

6. In a trailer having its front end pivotally supported by the rear end of a tractor and having its rear end supported by wheels, a detachable unit secured to the lower side of the trailer frame and having an internal combustion engine mounted therein, a pair of traction wheels pivotally supported by the framework, means controlled by the driver of the tractor for raising and lowering the traction wheels of the unit out of and into contact with the roadway, means for automatically delivering an increased amount of fuel to said engine when the traction wheels have a predetermined amount of pressure applied thereto to hold them in contact with the roadway, means controlled by the driver of the tractor for regulating the fuel supplied to the engine of the unit, means controlled by the brake applying means of the tractor for reducing the supply of fuel to the engine of the unit, and means for automatically reducing the flow of fuel to the engine of the unit before the traction wheels of the unit are raised from contact with the roadway.

7. In a trailer having its front end pivotally supported by the rear end of a tractor and having its rear end supported by wheels, a unit secured to the lower side of the trailer frame and having an internal combustion engine mounted therein, a pair of traction wheels supported by the framework, means controlled by the driver of the tractor for raising and lowering the traction wheels of the unit out of and into contact with the roadway, means for automatically delivering an increased amount of fuel to said engine when the traction wheels have a predetermined amount of pressure applied thereto to hold them in contact with the roadway, means controlled by the driver of the tractor for regulating the fuel supplied to the engine of the unit, means controlled by the brake applying means of the tractor for reducing the supply of fuel to the engine of the unit, and means for automatically reducing the flow of fuel to the engine of the unit before the traction wheels of the unit are raised from contact with the roadway.

8. In a tractor and trailer, an auxiliary power unit mounted on the trailer and having traction wheels and including an internal combustion engine for driving the traction wheels, means normally holding the traction wheels out of contact with the roadway, means controlled by the driver of the tractor for lowering the tractor wheels into engagement with the roadway, means for supplying fuel to the internal combustion engine, after a predetermined amount of pressure has been applied to the tractor wheels to hold them in contact with the roadway, means also controlled by the driver of the tractor for reducing the fuel supply to the engine of the unit and for then raising the tractor wheels out of contact with the roadway and means for diminishing the supply of fuel to the engine of the unit when the brake mechanism of the tractor is brought into operation.

9. In a tractor and trailer, said tractor having brakes associated with its wheels, an auxiliary power unit mounted on the trailer and having traction wheels other than the wheels of the trailer, a prime mover mounted on the unit and having a driving connection with the traction wheels of the unit, means controlled by the driver of the tractor for controlling speed of the prime mover of the unit, means operable from the driver's seat in the tractor for lowering and raising the traction wheels of the unit into and out of engagement with the roadway, respectively, and means operable automatically by application of the brakes on the tractor for diminishing the amount of power generated by the prime mover.

10. In a trailer adapted to be pivotally secured at its front end to a tractor and having wheels at its rear end for supporting the trailer, an auxiliary power unit detachably connected to the lower side of the trailer and having a prime mover mounted thereon and having traction wheels driven by the prime mover, means for normally holding the traction wheels of the auxiliary power unit out of contact with the roadway, means controlled by the driver of the tractor for lowering said tractor wheels of the unit into contact with the roadway and for controlling the amount of power delivered by the prime mover on the unit, means preventing the generation of substantial power by the prime mover on the unit until after a predetermined amount of pressure has been applied to the tractor wheels of the unit to hold it in contact with the roadway, and means operable automatically upon the application of the brakes on the tractor by the operator for diminishing the amount of power generated by the prime mover on the unit.

11. In a trailer adapted to be pivotally secured at its front end to a tractor and having wheels at its rear end for supporting the trailer, an auxiliary power unit detachably connected to the lower side of the trailer and having a prime mover mounted thereon and having traction wheels driven by the prime mover, means for normally holding the traction wheels of the auxiliary power unit out of contact with the roadway, means controlled by the driver of the tractor for lowering said tractor wheels of the unit into contact with the roadway and for controlling the amount of power delivered by the prime mover on the unit, means preventing the generation of substantial power by the prime mover on the unit until after a predetermined amount of pressure has been applied to the tractor wheels of the unit to hold it in contact with the roadway, and means for varying the amount of power furnished by said prime mover in direct proportion to amount of pressure between the wheels of the unit and the ground.

12. In a trailer adapted to have its front end secured to a tractor and having wheels at its rear end for supporting the rear end of the trailer, a quickly detachable auxiliary power unit secured to the trailer and having a prime mover thereon and having traction wheels driven by the prime mover of the unit, and means within control of the driver of the tractor while the tractor and trailer are moving over a roadway for controlling the amount of power generated by the prime mover of the unit and for raising and lowering the tractor wheels of the unit, and means operable automatically by the application of the brakes by the driver of the tractor for reducing substantially the amount of power generated by the prime mover of the unit.

13. In a trailer adapted to have its front end pivotally secured to the rear end of a tractor and having wheels supporting the rear end of the trailer, a quickly detachable auxiliary power unit secured to the lower side of the trailer in advance of the wheels of the trailer and having an internal combustion engine carried thereby, a pair of traction wheels carried by the unit and being movable vertically with respect to the unit, means normally holding the traction wheels of the unit out of contact with the roadway, means controlled by the driver of the tractor while the tractor and trailer are moving over a roadway for lowering the traction wheels of the unit into contact with the roadway, and after said tractor wheels have been lowered a predetermined amount, for automatically supplying fuel to the internal combustion engine of the unit in proportion to the exerted pressure and for also allowing the tractor wheels of the unit to be raised out of contact with the roadway after the fuel supply to the internal combustion engine has been diminished, and means operable automatically upon application of the brakes in the tractor for diminishing the fuel supply to the engine of the unit without allowing the wheels of the tractor to be raised.

14. A truck, including supporting wheels and driving means therefor, and a semi-trailer for attachment to the truck, the semi-trailer having wheels supporting the rear end thereof, an auxiliary power unit including a motor suspended below the load platform of the trailer, said unit having traction wheels and means for normally holding them in elevated position, driving means between the motor of the unit and the traction wheels therefor, means controlling the operation of the motor of the unit and the raising and lowering of the tractor wheels of the unit, and means operable automatically upon the application of brakes by the operator of the tractor for substantially decreasing the power generated by the motor of the unit.

15. A truck including supporting wheels and driving means therefor and a semi-trailer for attachment to the truck, the semi-trailer having wheels supporting the rear end thereof, an auxiliary power unit including a motor and vertically movable traction wheels suspended below the load platform of the trailer, means normally holding the traction wheels of the trailer in elevated position, means controlled by the operator of the truck for lowering said wheels and for substantially increasing the revolutions per minute of the motor after the traction wheels have had a predetermined amount of pressure applied thereto to hold them in contact with the roadway and means operable automatically upon application of brakes to the truck by the operator thereof for decreasing the revolutions per minute of the motor of the unit.

16. In a tractor and trailer, wheels supporting the rear end of the trailer, an auxiliary power unit suspended beneath the trailer and having traction wheels mounted thereon for vertical movement, an internal combustion engine having a driving connection with the traction wheels of the unit, means normally holding the traction wheels of the unit in elevated position out of contact with the roadway, means controlled by the driver of the tractor for lowering the tractor wheels into contact with the roadway, means for increasing the power of said engine after a predetermined amount of downward pressure has been applied to the traction wheels of the unit, said increase being in direct proportion to the applied pressure, said controlling means including means for raising the traction wheels out of contact with the roadway and for substantially diminishing the amount of fuel supplied to the engine of the unit before the traction wheels are raised out of contact with the roadway.

ISAAC W. SIMPKINS.
EUGENE R. NELSON.